United States Patent
Hepner

[11] Patent Number: 6,160,863
[45] Date of Patent: Dec. 12, 2000

[54] VARIABLE SPEED PUMP FOR USE IN NUCLEAR REACTOR

[75] Inventor: Philip H. Hepner, Suffield, Conn.

[73] Assignee: CE Nuclear Power LLC, Windsor, Conn.

[21] Appl. No.: 09/108,118

[22] Filed: Jul. 1, 1998

[51] Int. Cl.$^7$ .................................................. G21C 9/00
[52] U.S. Cl. ........................ 376/282; 376/298; 376/299; 376/307
[58] Field of Search .................. 376/298, 299, 376/282, 307

[56] References Cited

U.S. PATENT DOCUMENTS

| | | | |
|---|---|---|---|
| 3,568,781 | 3/1971 | Campbell | 376/402 |
| 3,630,022 | 12/1971 | Jubb | 376/391 |
| 3,722,545 | 3/1973 | Furlani | 137/625.3 |
| 3,742,409 | 6/1973 | Santis et al. | 376/258 |
| 4,037,818 | 7/1977 | Soderberg et al. | 251/121 |
| 4,056,602 | 11/1977 | Matovich | 423/345 |
| 4,095,974 | 6/1978 | Matovich | 75/345 |
| 4,108,574 | 8/1978 | Bartley et al. | 417/19 |
| 4,150,546 | 4/1979 | Collett | 376/211 |
| 4,233,116 | 11/1980 | Mangus | 376/277 |
| 4,514,991 | 5/1985 | Zinsmayer | 62/209 |
| 4,550,747 | 11/1985 | Woodworth et al. | 137/487.5 |
| 4,678,404 | 7/1987 | Lorett et al. | 417/45 |
| 4,715,324 | 12/1987 | Muller et al. | 122/381 |
| 4,773,826 | 9/1988 | Mole | 417/50 |
| 5,064,603 | 11/1991 | Hurwitz et al. | 376/246 |
| 5,120,489 | 6/1992 | Dillmann | 376/230 |
| 5,240,380 | 8/1993 | Mabe | 417/43 |
| 5,397,949 | 3/1995 | Guardiani et al. | 310/51 |
| 5,473,787 | 12/1995 | Echols | 15/104.061 |
| 5,612,982 | 3/1997 | Woodcock et al. | 376/298 |
| 5,619,433 | 4/1997 | Wang et al. | 395/500.39 |

FOREIGN PATENT DOCUMENTS 4-60538   2/1992   Japan .

OTHER PUBLICATIONS

Frank J. Rahn, et al. "A Guide To Nuclear Power Technology, A Resource for Decision Making" 1992, pp. 268–272.

*Primary Examiner*—Michael J. Carone
*Assistant Examiner*—Fredrick T. French, III
*Attorney, Agent, or Firm*—Henry T. Crenshaw, Jr., Esq.; Ronald P. Kananen; Rader, Fishman & Grauer

[57] ABSTRACT

A nuclear reactor coolant system includes a primary coolant circuit connected to a secondary coolant circuit. A desired amount of coolant is bled from the primary circuit to the secondary circuit for purification and controlling chemical composition of the coolant. Variable speed charging pumps are provided in the secondary circuit to pump coolant back into the primary circuit at variable pressures and flow rates. A pressurizer level control system is also disclosed for controlling pump speeds.

4 Claims, 2 Drawing Sheets

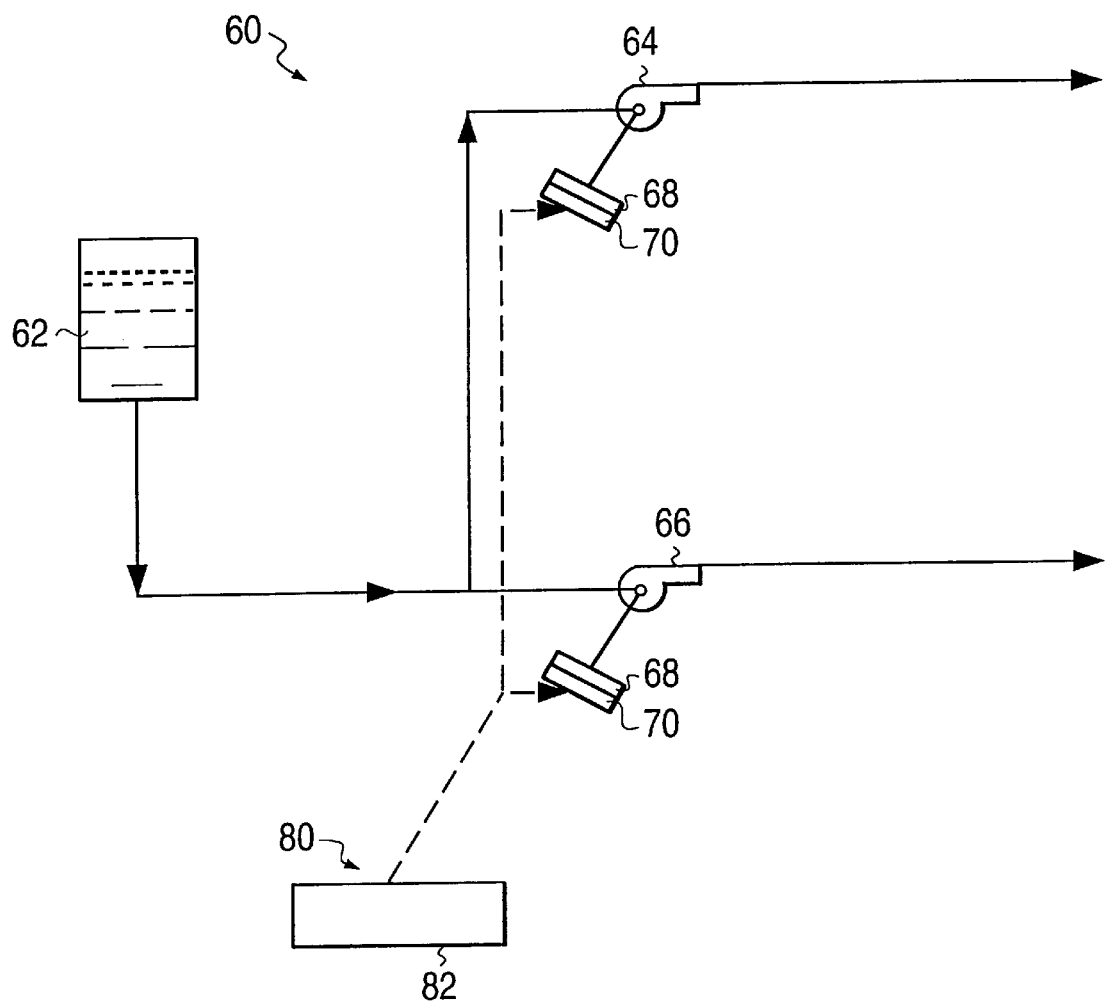

VARIABLE SPEED PUMP FOR USE IN NUCLEAR REACTOR

FIELD OF THE INVENTION

The present invention relates to a coolant system for a nuclear reactor and, in particular, volume control system having a variable speed pump to regulate the rate of charging flow into a primary coolant circuit.

BACKGROUND OF THE INVENTION

Nuclear reactors have coolant circulating at high pressures through a coolant circuit that flows past a reactor vessel which heats the coolant producing steam that turns a steam generator to produce energy. Corrosion and wear in a cooling system produces impurities in the coolant. These unwanted impurities must be removed to sustain efficient energy production and transfer of heat. It is known to continuously remove or bleed coolant from a primary coolant circuit to a secondary circuit that removes unwanted impurities. This bleeding is termed letdown flow. Typically, coolant in the secondary circuit is communicated to a letdown cooler before passing to a demineralizer where impurities are removed. Next, the coolant is stored in a makeup surge tank until being pumped back into the primary coolant circuit by a constant speed pump. Flow control valves located downstream of the constant speed pump, are provided to regulate the rate of flow and pressure of the coolant as it is being pumped back into the primary circuit. This replenishing is called charging flow.

Loss of coolant is known to occur due to leaks, damaged seals, or during the purification process. Therefore, the makeup surge tank needs to have sufficient storage capacity to enable replacing lost coolant and accommodate for changes in the total coolant volume in the primary circuit. Varying the volume of coolant in the primary circuit also controls the concentration of boron in the primary circuit and is critical for the efficient operation of a nuclear reactor plant.

Using control valves to determine the rate of charging flow and letdown flow has many drawbacks. For example, control valves are subject to wear and require maintenance. In addition, maintenance personnel could be exposed to radioactive materials when servicing worn out control valves. Further, a constant speed pump develops constant high pressures which must be reduced by throttling at the control valves to achieve a desired lower pressure. Thus, energy is wasted because pump energy is added to pressurize the coolant to a constant pressure, which energy is in turn dissipated during throttling to a lower pressure before re-introducing coolant into the primary circuit.

Charging flow and letdown flow are varied to change the concentration of boron in the coolant for reactivity control or to compensate for volume changes caused by temperature changes in the reactor coolant system. However, power losses are associated with varying the makeup and letdown flows. Therefore, there is an operating incentive to operate at minimum letdown and makeup flows that still provide a proper coolant chemistry. In a conventional system, operating at minimum letdown and makeup flows requires maximum throttling by the control valves. Maximum throttling, in turn, involves maximum energy being wasted.

SUMMARY OF THE INVENTION

The present invention is directed to a volume control system for a nuclear reactor having a primary coolant circuit for cooling a nuclear reactor and a secondary coolant circuit connected to the primary coolant circuit and including a letdown heat exchanger for receiving a desired amount of coolant being bled from the primary coolant circuit. In addition, a fluid source is provided to receive and store the coolant from the letdown heat exchanger. A variable speed pump is connected to the fluid source and returns coolant into the primary coolant circuit at a variable rate that is selected based in part on a rate of letdown flow.

The present invention also includes a reactor coolant system for a nuclear reactor having a primary coolant circuit for cooling a nuclear reactor and a secondary coolant circuit connected to the primary coolant circuit and including a fluid source for receiving coolant which is selectively drained from the primary coolant circuit, the fluid source having a free liquid surface. At least one variable speed pump is in fluid communication with the fluid source and delivers coolant to the primary coolant circuit at variable flow rates and pressures. Moreover, the variable speed pump can be a centrifugal pump having a variable speed drive connected between a power supply and a motor. In one embodiment, an AC variable speed drive is connected between an AC power supply and a synchronous AC motor, however, any suitable type of power supply and motor can be used.

The present invention eliminates the need for throttling control valves because a variable speed pump is provided that can deliver coolant into the primary coolant circuit at variable flow rates and pressures. Thus, the present invention is more energy efficient because the variable speed pump only uses a sufficient amount of energy to deliver variable coolant pressure rather than developing constant, high coolant pressure that must be throttled at the control valves to a lower pressure, as in the prior art system.

Further, component parts of the coolant system can be redesigned because excess pressures that previously occurred for long time periods, now occur for much shorter time periods. Therefore, the need for very robust component parts is reduced and more cost effective components can be utilized.

Still further, throttling control valves are generally high maintenance devices due to the dynamic loading that they encounter. The present invention eliminates the need for throttling control valves and therefore reduces maintenance costs. The AC variable speed drive is used to achieve flow control in the present invention. Thus, maintenance personnel are not at risk of radioactive exposure during repair work since the AC variable speed drive is not part of the coolant circuit.

BRIEF DESCRIPTION OF THE DRAWINGS

The features and inventive aspects of the present invention will become more apparent upon reading the following detailed description, claims, and drawings, of which the following is a brief description:

FIG. 2 is a schematic view of a charging pump system according to the present invention.

DETAILED DESCRIPTION OF PREFERRED EMBODIMENTS

Figure 1:
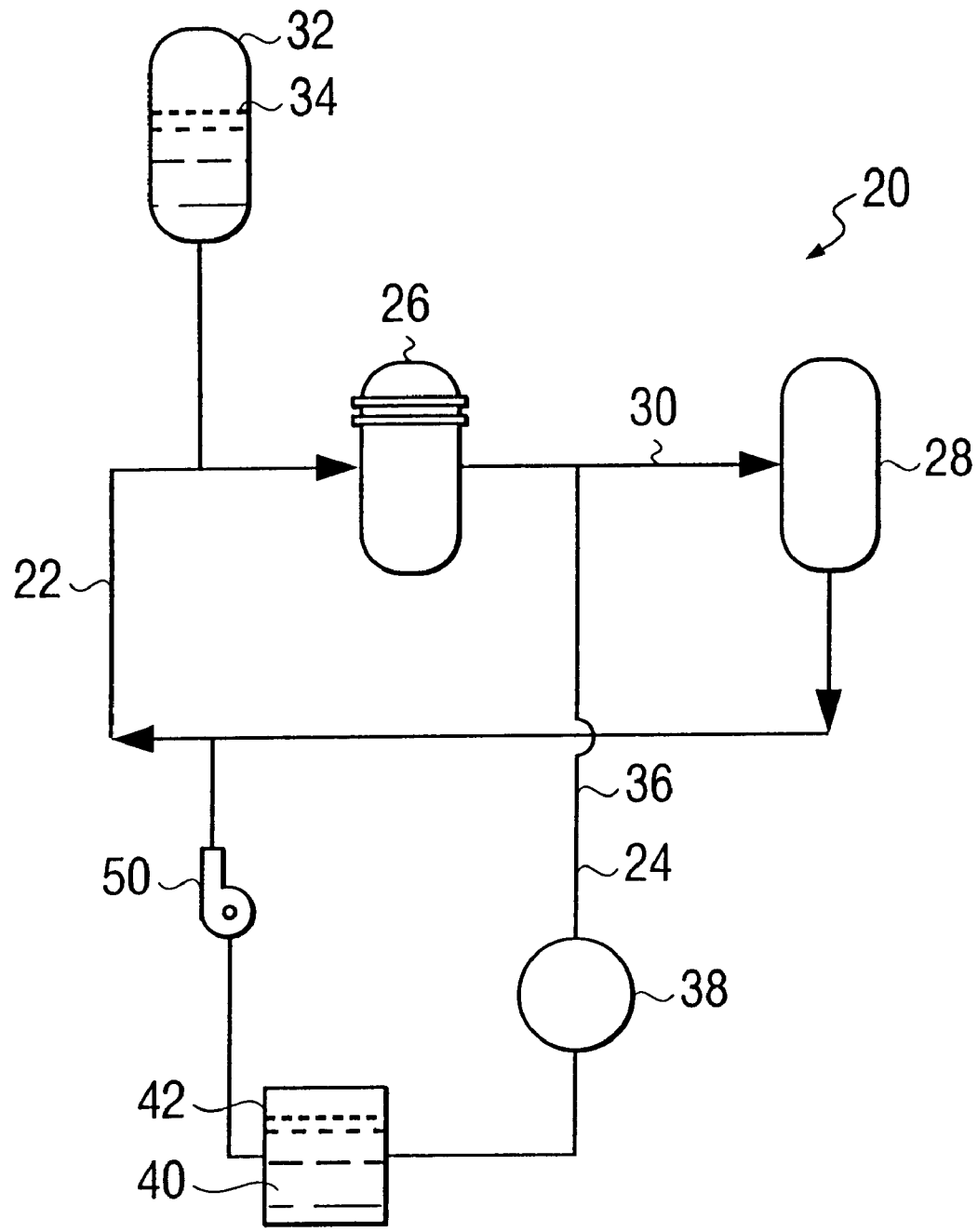
FIG. 1 is schematic view of a nuclear reactor cooling system according to the present invention.

FIG. 1 shows a schematic view of a nuclear reactor cooling system 20 having a primary coolant circuit 22 connected to a secondary coolant circuit 24. The primary coolant circuit 22 includes a reactor 26 connected to a steam generator 28 by a coolant line 30. A fluid source 32 having a free liquid surface 34 also communicates with the reactor 26 and ensures sufficient coolant volumes in the primary coolant circuit 22.

The secondary coolant circuit 24 has a drain line 36 connected to the coolant line 30 for bleeding a predetermined amount of coolant to a letdown heat exchanger 38. A makeup tank 40 is coupled to the letdown heat exchanger 38 and includes a free liquid surface 42. The makeup tank 40 receives coolant from the heat exchanger 38 and stores the coolant until it is needed for controlling volume levels in primary coolant circuit 22. A charging pump 50 is connected to the makeup tank 40 and pumps coolant from the secondary coolant circuit 24 back into the primary coolant circuit 22. Preferably, the charging pump 50 is a variable speed pump that can deliver coolant at variable pressures and flow rates, as desired to change coolant volumes and/or match letdown flow rates with charging flow rates. Charging and letdown flow rates can be varied to effect changes in the boron concentration in the coolant to control reactivity. Further, coolant volume changes occur due to temperature changes in the primary coolant circuit 22.

By utilizing variable speed charging pumps 50, the present invention eliminates the need for throttling valves to reduce constant coolant pressure developed by a constant speed pump, as in conventional reactor coolant systems.

FIG. 2 shows a portion of a charging pump system 60 having a makeup tank 62 connected to first and second variable speed charging pumps 64, 66. Each variable speed pump 64, 66 preferably has an AC synchronous motor 68 connected to an AC variable speed drive 70. However, other suitable variable speed arrangements and motors can be used without departing from the spirit of the present invention. For example, the present invention can have any suitable type of motor, including but not limited to, an asynchronous induction motor. Moreover, the present invention is not limited only to AC. Other suitable power sources can be used including, for example, DC.

More specifically, AC variable speed drive 70 is located between an AC power supply bus (not shown) and a synchronous AC motor 68 of each charging pump 64, 66. Coolant flow is varied by modifying the frequency of a power supply (not shown) using the AC variable speed drive 70, which results in varying the speed of the respective charging pump 64, 66. Pump speed reduction reduces the pressure developed by the pump and reduces the rate of coolant flow.

In addition, a pressurizer level control system 80 is optionally, but preferably, connected to each variable speed drive 70 and includes a pressurizer level control processor 82 to monitor and control the level of pressure and flow rates in the reactor coolant system 20. Pressurizer level is maintained as a function of desired plant power by adjusting charging pump speed. Thus, pressurizer level control system 80 independently controls the speed of the first and second variable speed charging pumps 64, 66. Charging flow will match letdown flow when pressurizer level is maintained constant.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A volume control system for a nuclear reactor comprising:
   a primary coolant circuit for cooling a nuclear reactor, said primary coolant circuit including a pressurizer connected thereto;
   a secondary coolant circuit connected to said primary coolant circuit comprising:
      a letdown heat exchanger for receiving a desired amount of coolant being bled from said primary coolant circuit;
      a fluid source for receiving and storing said coolant from said letdown heat exchanger;
      at least first and second variable speed charging pumps connected to the fluid source for returning coolant into said primary coolant circuit at a variable rate that is selected based in part on a rate of letdown flow; and
   a pressurizer level control system connected to each of said first and second variable speed charging pumps to independently control the speed of each of said first and second charging pumps in accordance with a level of coolant in the pressurizer.

2. The volume control system of claim 1, wherein said pressurizer level control system includes a processor for monitoring and controlling the level of pressure and flow rates in the volume control system.

3. The volume control system of claim 1, wherein said variable speed drive is an AC variable speed drive, said power supply is an AC power supply bus and said motor is a synchronous AC motor.

4. The volume control system of claim 1, wherein a rate of charging flow into said primary coolant circuit is approximately the same as the rate of letdown flow.

* * * * *